(12) United States Patent
Nozaki et al.

(10) Patent No.: US 8,212,909 B2
(45) Date of Patent: Jul. 3, 2012

(54) DIGITAL CAMERA

(75) Inventors: Hirotake Nozaki, Koto-ku (JP); Akira Ohmura, Shibuya-ku (JP); Tadashi Ohta, Yokohama (JP)

(73) Assignee: Nikon Corporation, Tokyo (JP)

( * ) Notice: Subject to any disclaimer, the term of this patent is extended or adjusted under 35 U.S.C. 154(b) by 161 days.

(21) Appl. No.: 12/805,008

(22) Filed: Jul. 7, 2010

(65) Prior Publication Data

US 2010/0277599 A1 Nov. 4, 2010

Related U.S. Application Data

(63) Continuation of application No. 10/924,769, filed on Aug. 25, 2004, now abandoned.

(30) Foreign Application Priority Data

Sep. 2, 2003 (JP) .................................. 2003-309624
Sep. 2, 2003 (JP) .................................. 2003-309625

(51) Int. Cl.
*H04N 5/222* (2006.01)
*H04N 5/225* (2006.01)
*H04N 5/232* (2006.01)

(52) U.S. Cl. ............. 348/333.01; 348/33.05; 348/207.1; 348/211.2

(58) Field of Classification Search ................ 348/207.1, 348/333.1, 333.5, 333.11, 333.12, 211.13, 348/211.1, 211.2; 345/698, 699
See application file for complete search history.

(56) References Cited

U.S. PATENT DOCUMENTS

| | | | |
|---|---|---|---|
| 6,317,141 B1 * | 11/2001 | Pavley et al. ................. | 715/732 |
| 6,445,412 B1 | 9/2002 | Shiohara | |
| 6,704,506 B2 | 3/2004 | Sasagawa | |
| 6,734,877 B1 | 5/2004 | Honda et al. | |
| 2002/0021359 A1 | 2/2002 | Okamoto | |
| 2002/0041753 A1 * | 4/2002 | Itoh ............................... | 386/46 |
| 2002/0057473 A1 | 5/2002 | Umeyama | |
| 2004/0061797 A1 * | 4/2004 | Takahashi et al. ........ | 348/333.01 |
| 2006/0220986 A1 | 10/2006 | Takabe et al. | |

FOREIGN PATENT DOCUMENTS

| | | |
|---|---|---|
| JP | A-11-212755 | 8/1999 |
| JP | A-2000-101915 | 4/2000 |
| JP | A-2001-016545 | 1/2001 |
| JP | A-2001-230992 | 8/2001 |
| JP | A-2002-247429 | 8/2002 |
| JP | A-2003-92694 | 3/2003 |

* cited by examiner

*Primary Examiner* — Nhan T Tran
(74) *Attorney, Agent, or Firm* — Oliff & Berridge, PLC

(57) ABSTRACT

The object of the present invention is to provide a digital camera capable of deciding display form of the multi-display optimally suited an external monitor on the basis of detecting pixel information of the external monitor connected to the digital camera. In one aspect of the present invention, a digital camera includes a memory that stores a plurality of image frames, a display that shows an image frame, an output means that outputs image data to an electric instrument, a multi-display forming means that shows simultaneously a plurality of image frames stored in the memory, an image selection means that selects a given image frame among the plurality of image frames of the multi-display shown on the display, and a controller that controls such that when the multi-display is shown on the display, only the given image data selected by the image selection means is output from the output means.

10 Claims, 9 Drawing Sheets

DIGITAL CAMERA

This application is a continuation of U.S. patent application Ser. No. 10/924,769, filed Aug. 25, 2004. The disclosure of the prior application is hereby incorporated by reference herein in its entirety.

INCORPORATION BY REFERENCE

The disclosures of the following priority applications are herein incorporated by reference:

Japanese Patent Application No. 2003-309624 filed on Sep. 2, 2003;

Japanese Patent Application No. 2003-309625 filed on Sep. 2, 2003.

BACKGROUND OF THE INVENTION

1. Field of the Invention

The present invention relates to a digital camera, and in particular to a way to display an image data on a large screen monitor connected to the digital camera through a network.

2. Description of Related Art

Until recently, image data shot or reproduced by a digital camera has been confirmed by a small LCD display attached by the digital camera. In order to confirm with a large screen, the digital camera can output either digital or analogue video signal to an ordinary domestic TV set. Recently, various wireless LAN methods have been proposed. Among them, UWB (Ultra Wideband) or IEEE802.11g for one of a short-range wireless communication method realizes a data transmission rate of 100 Mbps, so that the waiting time accompanying with a large amount of data transmission is drastically reduced. By connecting domestic instruments including these functions with a wireless LAN, it becomes possible to construct a new domestic network that has never been accomplished.

Japanese Laid-Open Patent Application No. 2000-101915 discloses a reproduction device that expands and outputs an image signal of a designated program only based on a reproduction signal from a medium on which reduced images of a plurality of programs is stored in a frame. Japanese Laid-Open Patent Application No. 11-212755 discloses an image display device (scanner) including a display decision means that decides the number and the size of reduced images suitable for a monitor screen on the basis of information regarding input monitor screen. Japanese Laid-Open Patent Application No. 2001-16545 discloses an image reproduction device that outputs image signals suitable for an external display upon connecting the external display. Specifically, relative to a display form of a built in display, a display form of an external display becomes small in proportional to the display size. Moreover, it discloses that image signals providing to the built in display are made to be equal to those providing to an external display or the built in display is not shown.

Output data from an ordinary digital camera is the same one shown on the LCD monitor of the digital camera, so that an image stored in the digital camera can merely be seen on an externally arranged large screen monitor. It cannot be said that the merit that there are two monitors and one of them has a large screen is effectively used.

In the aforementioned prior art, regardless of the size of the external monitor connected to the digital camera, a fixed multi-display is simply output to the external monitor. Or, although information regarding the size of the external monitor is detected, the display form of the output multi-display is determined by detecting only the size or the aspect ratio of the display.

SUMMARY OF THE INVENTION

The present invention is made in view of the aforementioned problems and has an object to provide a digital camera capable of deciding display form of the multi-display optimally suited an external monitor on the basis of detecting pixel information of the external monitor connected to the digital camera.

A first aspect includes a memory that stores a plurality of image frames, a display that shows an image frame, an output means that outputs image data to an electric instrument, a multi-display forming means that shows simultaneously a plurality of image frames stored in the memory, an image selection means that selects a given image frame among the plurality of image frames of the multi-display shown on the display, and a controller that controls such that when the multi-display is shown on the display, only the given image data selected by the image selection means is output from the output means. Accordingly, a multi-display is reproduced on an LCD monitor of the digital camera, and only an image data of one image frame selected from the displayed multi image frames, so that only a selected image frame can be displayed on the large screen of the external monitor.

A secone aspect further includes a measuring means that measures a lapsed time after the image selection means selects the given image frame, and a detecting means that detects that the measured time measured by the measuring means passes a given time, wherein the control means controls such that when the detecting means detects that the lapsed time after the image selection means selects the given image frame has passed the given time, the image data of the given image frame selected by the image selection means is output from the output means. Accordingly, when a particular image data is to output to the external monitor, since the image data is output at a given time after selecting the image frame, only the image data to be output can be securely output to the external monitor.

A third aspect further includes a measuring means that measures a lapsed time after the image selection means selects the given image frame, and a detecting means that detects that the measured time measured by the measuring means passes a given time, wherein the control means controls such that the control means continues outputting the image data of the image frame shown on the display until the detecting means detects that the lapsed time has passed the given time. Accordingly, since a previous image frame is continuously shown for a given time after selecting a new image frame, a blank image frame does not shown on the display without showing a given time period.

A fourth aspect is characterized in that the output means outputs the image data to the electric instrument through a network. A fifth aspect is characterized in that the image data is the whole image data of the image frames stored in the memory. A sixth aspect is characterized in that the image data is the image data stored in the memory after thinned out with a given ratio.

A seventh aspect includes a memory that stores a plurality of image frames, a display that shows an image frame, an output means that outputs image data to an electric instrument, a multi-display forming means that shows simultaneously a plurality of image frames stored in the memory, an image selection means that selects a given image frame among the plurality of image frames of the multi-display shown on the display, a controller that controls the output means to output an image data of the given image frame selected by the image selection means, and an output selection means that selects either the image data of the given image frame selected by the image selection means or the image data of the multi-display to output from the output means upon showing the multi-display on the display. Accordingly, either the multi-display reproducing on the digital camera or an image frame selected from the multi-display can be selected as an output data for the external monitor.

An eight aspect includes a memory that stores image frames, a display that shows an image frame, an output means that outputs image data to an electric instrument, a selection means that selects a given image frame among the image frames stored in the memory, a measuring means that measures a lapsed time after the selection means selects the given image frame, a detecting means that detects that the measured time measured by the measuring means passes a given time, and a control means that controls such that when the detecting means detects that the lapsed time after the selection means selects the given image frame has passed the given time, the image data of the given image frame selected by the selection means is output from the output means. Accordingly, when a particular image data is to output to the external monitor, since the image data is output at a given time after selecting the image frame, only the image data to be output can be securely output to the external monitor.

A ninth aspect includes a memory that stores image frames, a display that shows an image frame, an output means that outputs image data to an electric instrument, a selection means that selects a given image frame among the image frames stored in the memory, a measuring means that measures a lapsed time after the selection means selects the given image frame, a detecting means that detects that the measured time measured by the measuring means passes a given time, and a control means that controls such that the output means continues outputting the image data of the image frame shown on the display until the detecting means detects that the lapsed time has passed the given time. Accordingly, since a previous image frame is continuously shown for a given time after selecting a new image frame, a blank image frame does not shown on the display without showing a given time period.

A tenth aspect includes a first display that shows an image data, an interface that communicates data with a display means having a second display that shows an image data, a discrimination means that discriminates horizontal and vertical pixel information of the second display connected through the interface, and a setting means that sets the number of reduced image frames such that in a multi-display showing a plurality of image frames on the same image screen at a time, the number of the plurality of image frames is set to a given number of image data for the first display and is set to the number of reduced image frames based on the discrimination result of the discrimination means for the second display. Accordingly, in the display of the digital camera, the number of the multi-display is a given number. However, in the display means connected to the digital camera, the number of the multi-display can be optimally set in accordance with the information regarding the pixel number of the display means.

A eleventh aspect further includes an output means that outputs from the interface the multi-display of the number of the image data selected either that of the given number set by the setting means or that based on the discrimination result of the discrimination means.

A twelfth aspect further includes a instruction means that instructs the first display to show the multi-display having the same number of image data as the multi-display shown on the second display set by the setting means. Accordingly, the same number of image data as the multi-display of the external display can be shown on the display of the digital camera. A thirteenth aspect is characterized in that the number of the image data of the multi-display shown on the second display is different from the given number of the image data.

A fourteenth aspect further includes an output means that outputs output data of the multi-display shown on the second display from the interface, and an off instruction means that instructs the first display to be off when the output means outputs output data. Accordingly, when the image data for the external monitor is output, user's confusion that the number of the multi-display shown on the digital camera is different from that of the external monitor can be prevented by making off the monitor of the digital camera.

A fifteenth aspect is characterized in that the interface communicates data with the display means through the network.

A sixteenth includes a first display that shows an image data, an interface that communicates data with a display means having a second display that shows an image data, a discrimination means that discriminates horizontal and vertical pixel information of the second display connected through the interface, and a setting means that sets an arrangement of reduced image frames such that in a multi-display showing a plurality of image frames on the same image screen at a time, an arrangement of the plurality of image frames is set to a given arrangement of image data for the first display and is set to the arrangement of reduced image frames based on the discrimination result of the discrimination means for the second display. Accordingly, when an image frame with one of shorter sides at the top such as a cellular phone is shown on an ordinary TV monitor with long sideways, even if the same number of multi-display is shown, the best arrangement for the multi-display can be determined in response to the image frame with long sideways or one of shorter sides at the top such.

A seventeeth aspect further includes an output means that outputs from the interface the multi-display of the arrangement of the image data selected either that of the given arrangement set by the setting means or that based on the discrimination result of the discrimination means. An eighteenth aspect further includes a instruction means that instructs the first display to show the multi-display having the same arrangement of image data as the multi-display shown on the second display set by the setting means. A nineteenth aspect is characterized in that the arrangement of the image data of the multi-display shown on the second display is different from the given arrangement of the image data.

A twentieth aspect further includes an output means that outputs output data of the multi-display shown on the second display from the interface, and an off instruction means that instructs the first display to be off when the output means outputs output data. Accordingly, when the image data for the external monitor is output, user's confusion that the number of the multi-display shown on the digital camera is different from that of the external monitor can be prevented by making off the monitor of the digital camera. A twenty-first aspect is characterized in that the interface communicates data with the display means through the network.

Other feature and advantages according to the present invention will be readily understood from the detailed description of the preferred embodiments in conjunction with the accompanying drawings.

DESCRIPTION OF THE PREFERRED EMBODIMENTS

Each embodiment of the present invention is explained below with reference to accompanying drawings.

Figure 1:
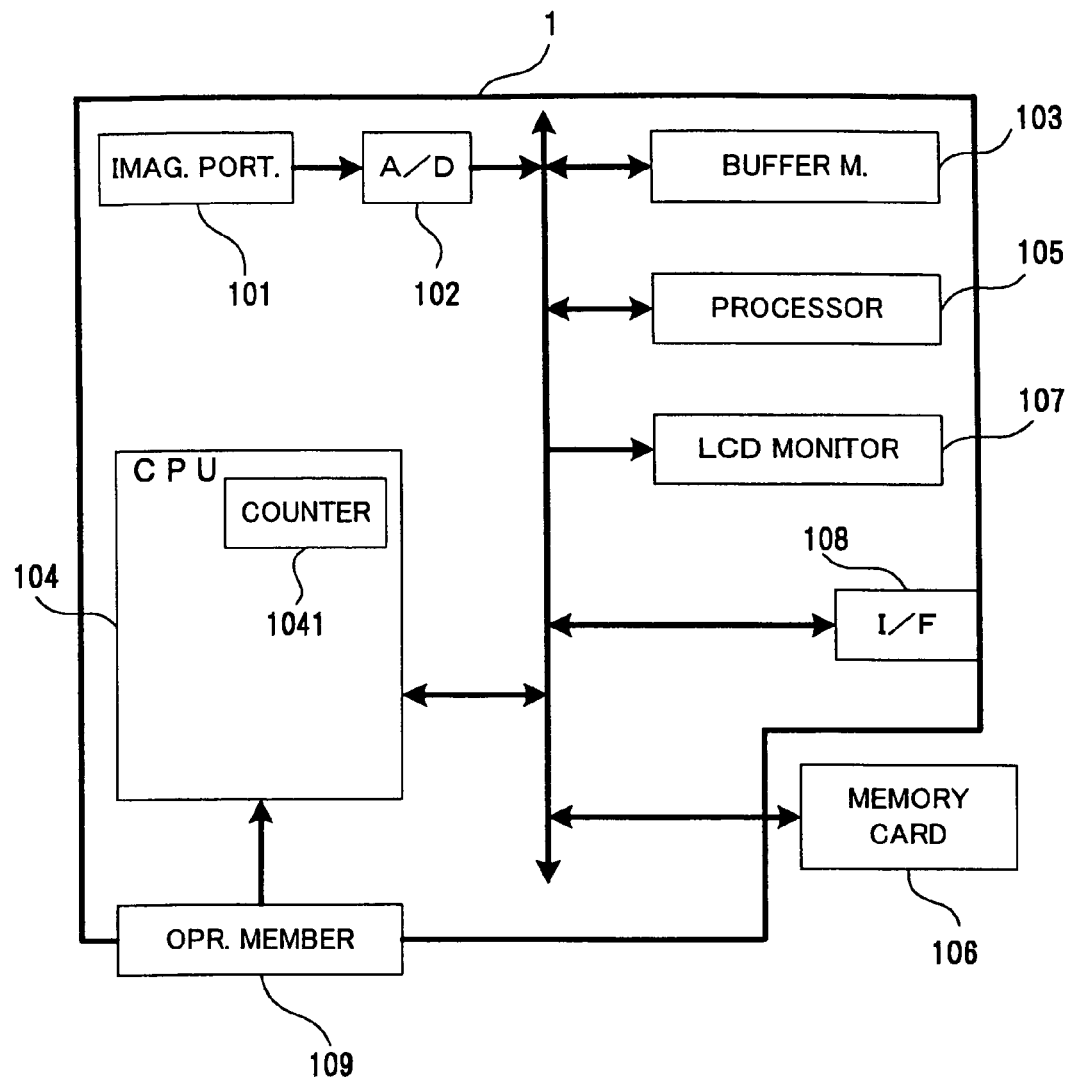
FIG. 1 is a block diagram showing the construction of a digital camera according to the present invention.

FIG. 1 is a block diagram showing major functions of a digital camera 1 according to the present invention.

An imaging portion 101 for imaging a subject is composed of an imaging lens, an aperture stop, a shutter, an imaging device, a driver for driving the imaging device, and the like. Here, the imaging device is a photoelectric imaging device using a CCD or MOS type solid-state imaging device for outputting an electric signal corresponding to the image intensity of an image of the subject formed on an imaging plane of the imaging device. An imaging signal from the imaging portion 101 is transformed by an A/D converter 102 into a digital signal and is stored temporally in a buffer memory 103. The buffer memory 103 can simultaneously store image data for a plurality of image frames shot by the imaging portion 101. The imaging signal is performed processing such as edge enhancement, gamma correction, color correction and the like, as well as compression/expansion processing upon storing/reproducing by a processor 105 in accordance with an instruction by a CPU 104. The processed data is also stored temporally in the buffer memory 103. The image data compressed by the processor 105 is stored if necessary in a memory card 106 removably loaded in the digital camera. The image data shot by the imaging portion 101 transferred by the A/D converter 102 into a digital signal is displayed on an LCD (liquid crystal display) monitor 107. The LCD monitor 107 is used also for displaying image data stored in the memory card 106 upon reproducing. The shot/reproduced image data is transferred also to an external display through an interface 108. The connection with the external display upon transferring the image data may be the one using a cable such as USB, IEEE1394, and the like, or the one using a wireless connection such as wireless LAN, Bluetooth, and the like. In the embodiment of the present invention, it is assumed that a digital camera and each electric instrument such as a TV monitor, and the like placed in each room is connected by a domestic wireless LAN. Among these electric instruments, those whose powers are on detect ID (identification information) of each other and are able to send/receive data in accordance with a predetermined procedure. When a plurality of instruments are detected, an instrument to be sent/received data is selected in accordance with a predetermined priority. An operating member 109 includes a shutter release button for instructing a start of shooting and is explained later at length in FIG. 2. CPU 104 controls whole sequence of the digital camera 1 upon shooting/reproducing. Moreover, the CPU 104 has a counter 1041 for counting a lapsed time from a selection of an image frame upon reproducing image data. This function is explained later in detail.

Figure 2:
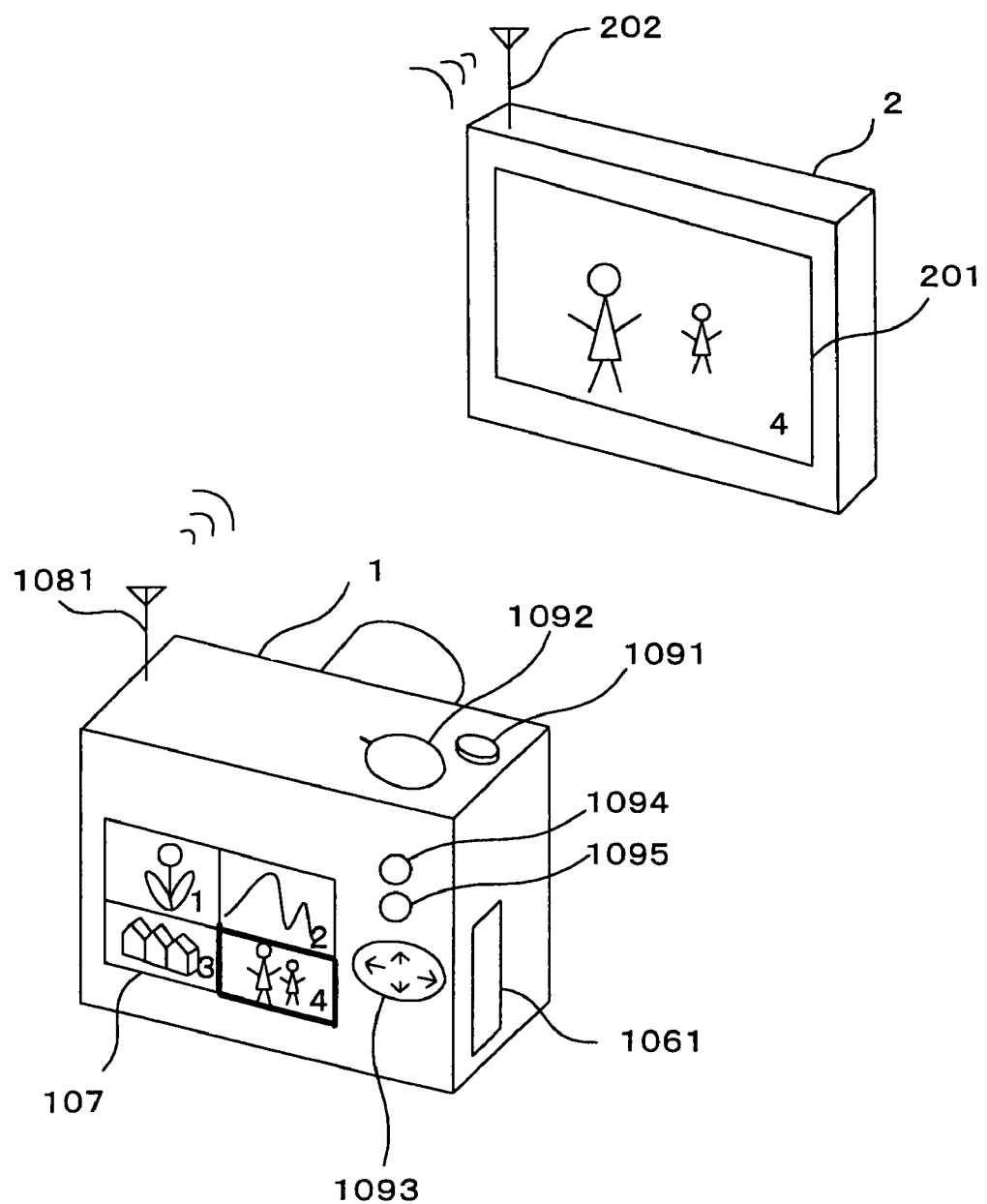
FIG. 2 is a drawing showing a display example of a digital camera and an external monitor according to the present invention.

An example of display according to the present invention is explained with reference to FIG. 2, when the digital camera 1 is connected to an external large display 2. In FIG. 2, the same member as in FIG. 1 is attached the same reference number. The external large display (external monitor) 2 may be a domestic TV monitor or a TV set with a large display 201. The TV set directly receives the data from the digital camera 1 by an antenna 202 with a protocol of a wireless LAN as well as receives an ordinary television program. Alternatively, a control server for controlling whole domestic network may be set up in order to communicate various data between each instrument through the server.

The external appearance of the digital camera 1 is explained. The above-described operating member 109 is constructed at least by respective buttons denoted by reference numbers 1091 through 1095. 1091 denotes a shutter release button for instructing to start shooting. 1092 denotes a select dial for selecting a storing mode or a reproduction mode. 1093 denotes a multi-selector for moving a cursor up, down, right or left on various menu items, which are shown on the display by pressing a menu display button 1094, in order to set and decide the item or function shown on the menu. The multi-selector 1093 may be used as various manners such as zooming in/out upon shooting, renewing a reproducing frame upon reproducing, selecting an image frame from multi-display images, or zooming in/out for a reproducing image frame. 1095 denotes a multi-display switching button for switching whether multi-frames or a single frame is displayed on the LCD monitor. 1061 denotes a slot for the memory card 106. 1081 denotes an antenna for transmitting various data to external monitors with a protocol of a wireless LAN. As an embodiment of the present invention, in FIG. 2, a right lower frame surrounded with a bold line (the frame number 4 is displayed in FIG. 2) among 4 frames of multi-display image displayed on the LCD monitor 107 is selected, and the image data of the selected frame is transmitted to the TV monitor 2 to be displayed on the large display 201.

Figure 3:
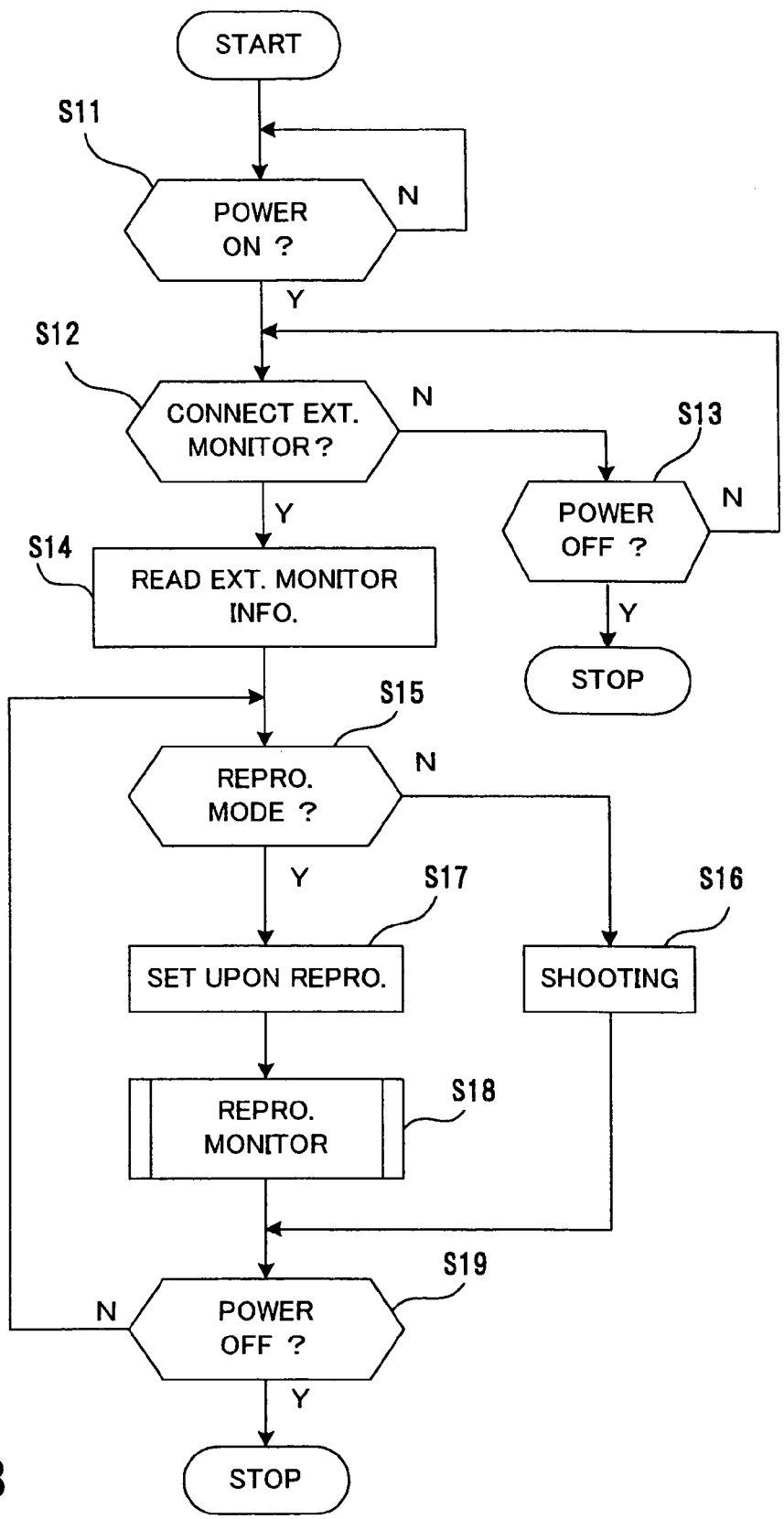
FIG. 3 is a flow chart explaining a reproduction movement of a digital camera according to the present invention.
Figure 4:
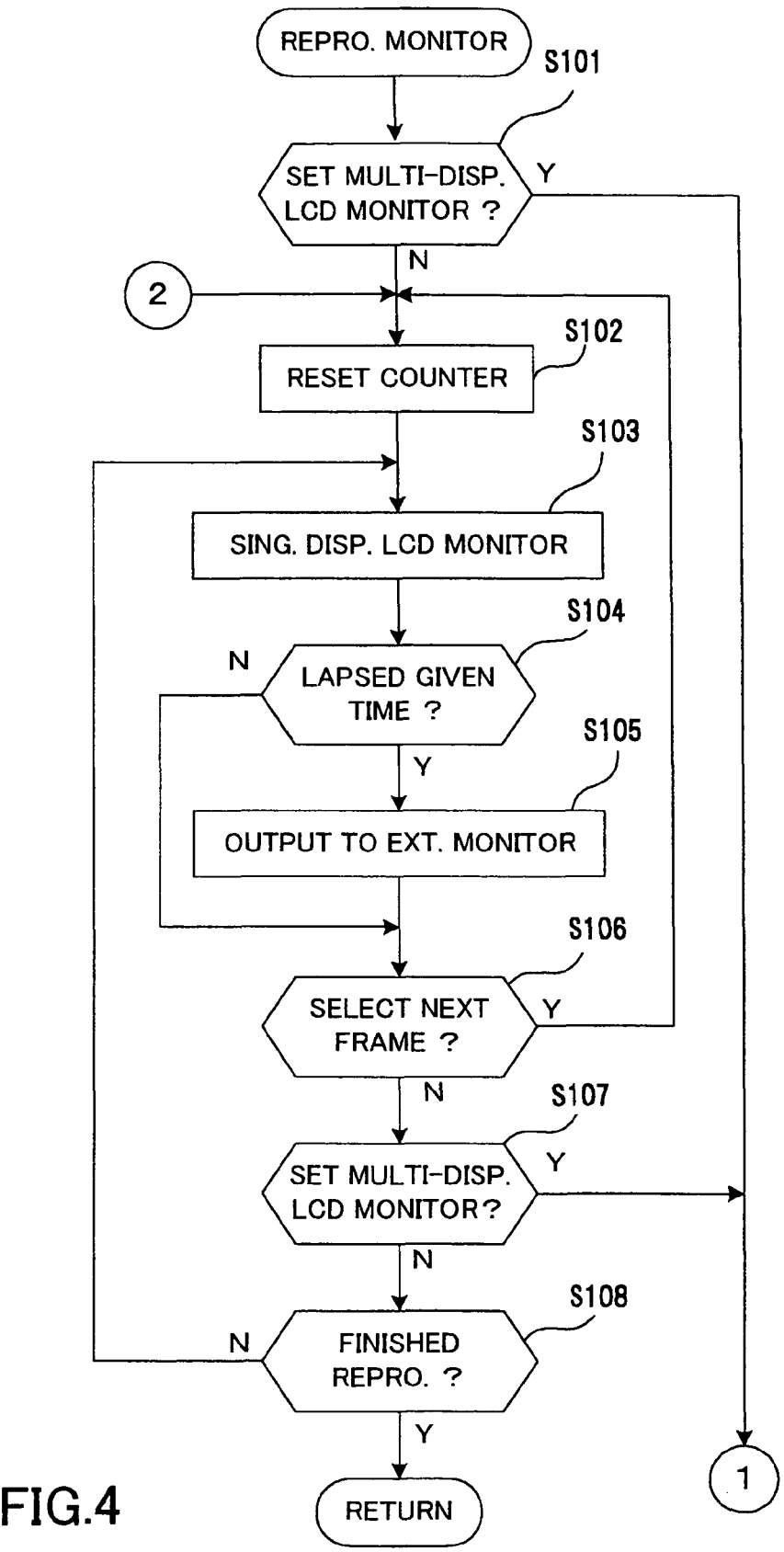
FIG. 4 is a flow chart explaining a display movement of a digital camera and an external monitor according to the present invention.

The procedure of the present invention is explained with reference to flow charts shown in FIG. 3 through 7. FIG. 3 is a flow chart showing an outline of a movement of the digital camera 1 according to the present invention upon connecting an external monitor 2. In step S11, whether the power switch of the digital camera is on or not is confirmed. When the power is on, the flow proceeds to step S12. In step S12, whether or not the digital camera 1 is connected with an external monitor 2 is checked by confirming the aforementioned identification information. The manner of connection may be either a wire connection or a wireless connection. When the digital camera 1 is not connected, the flow proceeds to step S13. In step S13, whether the power has been off or not is checked. When the power has been off, the flow proceeds to the end. When the power has not been off, the flow returns to step S12. In step S12, whether or not the digital camera 1 is connected with an external monitor 2 is checked. On the way to the loop of steps S12 and S13 when an external monitor 2 is not connected, the digital camera 1 independently carries out shooting or reproducing, but it is not necessary for the explanation of the present invention, so that the explanation is omitted.

In step S12, when it is confirmed that the digital camera 1 is connected with an external monitor 2, the flow proceeds to step S14. In step S14, the digital camera 1 reads out information regarding the external monitor 2 such as the numbers of vertical and horizontal pixels, the aspect ratio, and the like. In step S15, whether or not the reproduction mode is selected by the select dial 1092 is checked. When the shooting mode is set, the flow proceeds to step S16. In step S16, shooting procedure is carried out. When the reproduction mode is set, the flow proceeds to step S17.

In step S17, a display mode for selection frame or multi-frames display of the external monitor 2 or the LCD display 107 is set upon reproduction mode. The specific contents of the display mode are explained in step S18. In the display mode, in order to switch the display of the LCD monitor 107 from a single frame display to a multi-frames display, the aforementioned multi-display switching button 1095 is to be pressed. The other display modes are set by selecting the selection menu, which is shown on the LCD monitor 107 by pressing the menu display button 1094 and the contents of which are explained later in step S19, with the multi-selector 1093.

In step S18, in accordance with the display mode of the reproduction mode set in step S17, a reproduced image is displayed on the LCD monitor 107 or a given image data is shown on the external monitor 2. The detail of the reproduction on the monitor in step S18 is explained with reference to FIGS. 4 through 7. In step S19, whether or not the power switch of the digital camera 1 is off is checked. When the power switch is not off, the flow returns to step S15. When the power switch is off, the flow proceeds to the end.

The reproduction on the monitor shown in step S18 in FIG. 3 is explained with reference to FIGS. 4 through 7. At first, in step S101 in FIG. 4, whether the multi-frames display on the LCD monitor 107 is set by pressing the multi-display switching button 1095 is confirmed. When the multi-frames display is set, the multi-frames display of 4 frames as shown in FIG. 2 is displayed on the LCD monitor 107, and then the flow proceeds to S109 in FIG. 5. In this case, the number of frames shown in the multi-frames display can be set by the multi-selector 1093 to the other numbers such as 9 or the like.

When the multi-frames display is not set, the flow proceeds to step S102. In step S102, the counter 1041 explained in FIG. 1 is reset, and whether a given lapsed time from a single frame display has been passed is checked. When a given lapsed time has not been passed, the flow proceeds to step S106. When a given lapsed time has been passed, the flow proceeds to step S105. In step S105, the same image data shown on the LCD monitor 107 is output to the external monitor 2. In step S106, whether the selection of the next image frame is carried out or not is checked. The selection is carried out by the up/down function of the multi-selector 1093. When the next image frame is selected, the flow returns to step 5102, and the counter 104 is reset. When the next image frame is not selected, the flow proceeds to step S107. In step S107, whether the multi-frames display on the LCD monitor 107 is set or not is checked again. When it is confirmed that the multi-frames display is set, the flow proceeds to step S109 in FIG. 5. When it is confirmed that the multi-frames display is not set, the flow proceeds to step S108. In step S108, whether the select dial 1092 is set to other than the reproduction mode is checked. When the reproduction mode is continuously set, the flow returns to step S103 to show the selected image on the LCD monitor 107 continuously. In step S108, when it is confirmed that the reproduction mode has been finished, the flow proceeds to the end.

Figure 8:
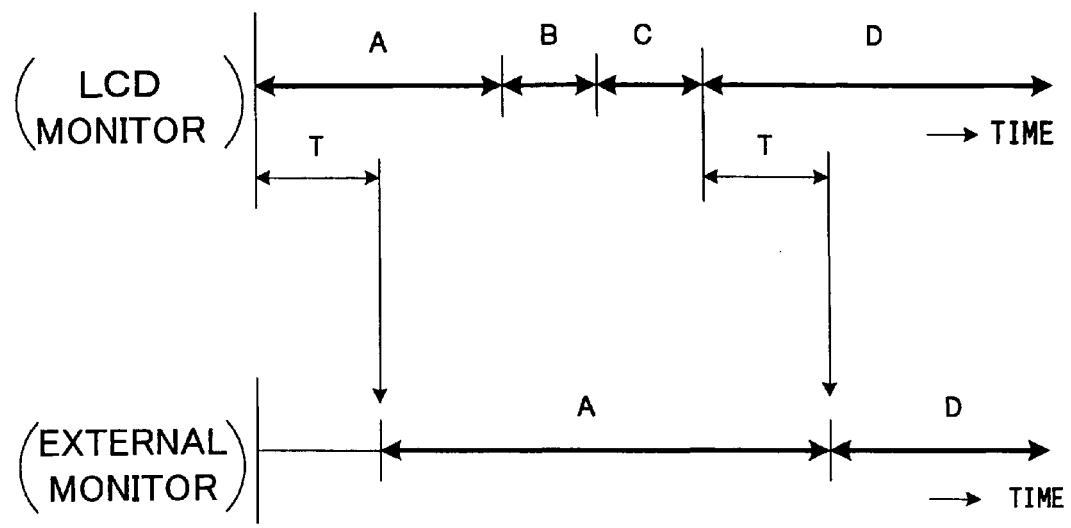
FIG. 8 is a timing chart of image display according to the present invention.

In this manner, the reproduction image of a single frame is displayed successively on the LCD monitor 107 in response to up/down operation of the multi-selector 1093. However in the large display 201 of the external monitor 2, even if a next image is selected within a predetermined time, the image is not shown. The display mode is explained with reference to FIG. 8. In FIG. 8, the upper chart shows image display timing of the LCD monitor 107. The lower chart shows that of the external monitor 2. In FIG. 8, image A starts being shown on the external monitor 2 a predetermined time (T) after selecting the image A. Then, the image A is continuously shown on the external monitor 2 because the predetermined time (T) does not have passed after selecting an image B, or C. Then, the displayed image on the external monitor 2 changes from A to D the predetermined time (T) after selecting an image D. Accordingly, restlessness that reproduced image is changed one after another on the external monitor 2 can be prevented. Moreover, since image data disinclined to show is actually not transmitted, the camera movement and network line can be used effectively. Here, although the predetermined time (T) is preferably about 0.5 second, the value should be changeable according to the user. The value can be easily set by the menu display button 1094 or the multi-selector 1093.

Figure 5:
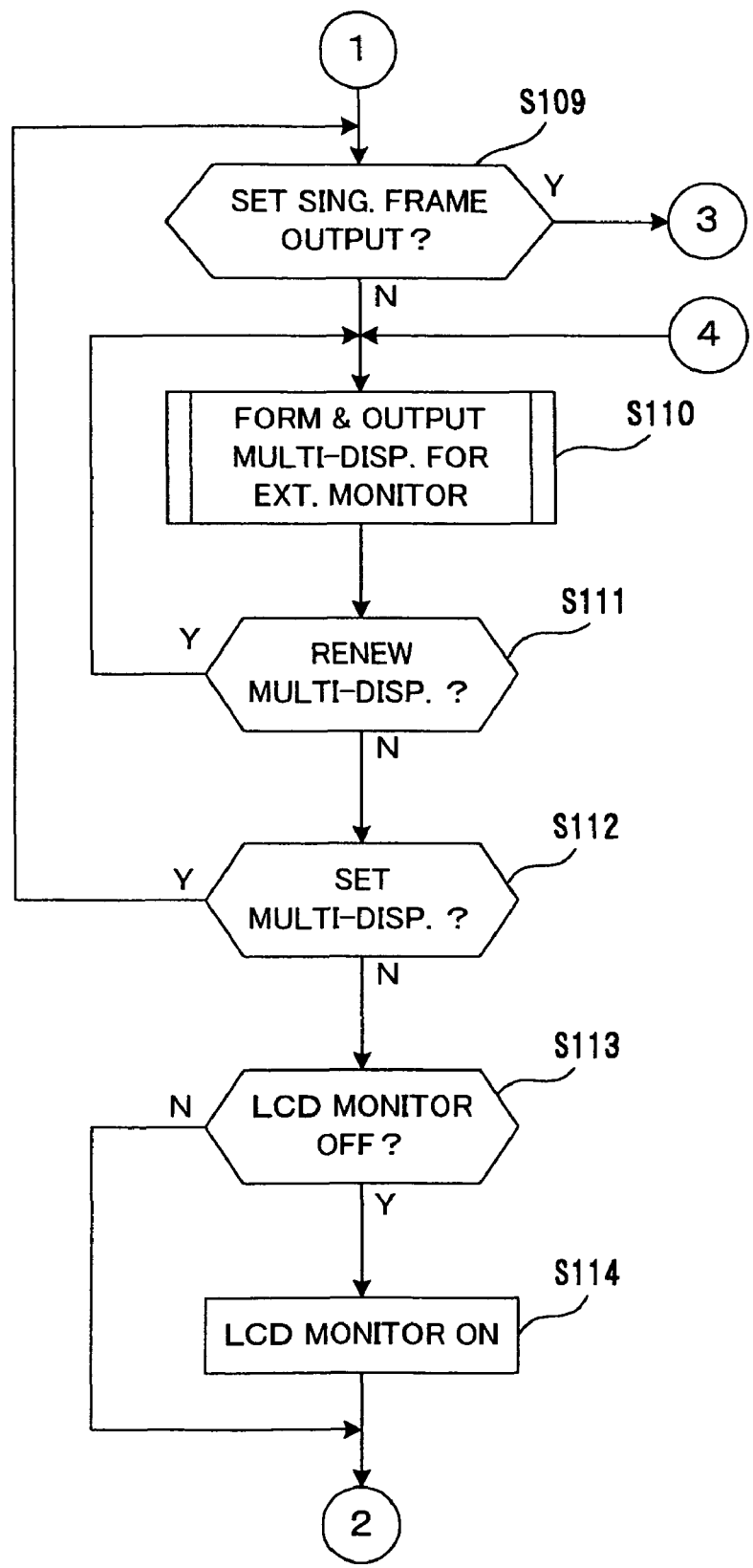
FIG. 5 is a flow chart explaining a display movement of a digital camera and an external monitor according to the present invention.

In step S101 or S107, when it is confirmed that the multi-frames display is set by the multi-display switching button 1095, the flow proceeds to step S109 in FIG. 5. In step S109, whether it is set that the same multi-display shown on the LCD monitor 107 is output to the external monitor 2 or that a single frame selected from the multi-display shown on the LCD monitor 107 is output to the external monitor 2 is checked. This setting is carried out by selecting an item "select external monitor output" (not shown) among select menu items that are shown by pressing the menu display button 1094. After the selection, since two items "output multi-display" and "output selected frame" are displayed (not shown), the setting is completed by selecting either one. The multi-selector 1093 is used for the setting. When "output selected frame" is selected, the flow proceeds to step S115. When "output multi-display" is selected, the flow proceeds to step S110. In step S110, in order to show multi-display on the LCD monitor 107 and the external monitor 2, multi-display data for respective image displays is formed. This step S110 is explained later in detail with reference to FIG. 7. In step S111, whether instruction for renewing the multi-display on the LCD monitor 107 or the external monitor 2 has been made or not is checked. As an example for renewing the multi-display, by using the multi-selector 1093 shown in FIG. 2, the image frame selection cursor (bold frame surrounding the frame number 4 in FIG. 2) is brought to upper left frame or lower right frame, and is further moved the same direction, then newly 4-frame image or 9-frame image is displayed. When the instruction for renewing is made in this manner, the flow returns to step S110 to show multi-display on the LCD monitor 107 or the external monitor 2. When the instruction for renewing is not made in step 5111, the flow proceeds to step S112. In step S112, whether the display mode is changed to a single frame display by the multi-display switching button 1095 is checked. When the setting is still multi-display mode, the flow returns to step S109. When it is confirmed that the display mode is changed to the single frame display, the flow proceeds to step S113. In step S113, whether the power of the LCD monitor 107 is off or not is checked. Although this is explained in detailed explanation of the step S110 in FIG. 7, there happens the case that the power of the LCD monitor 107 is off. When the power is off, the flow proceeds to step S114 to make on the power. When the power is on, the flow returns to step S102 in FIG. 4.

Figure 6:
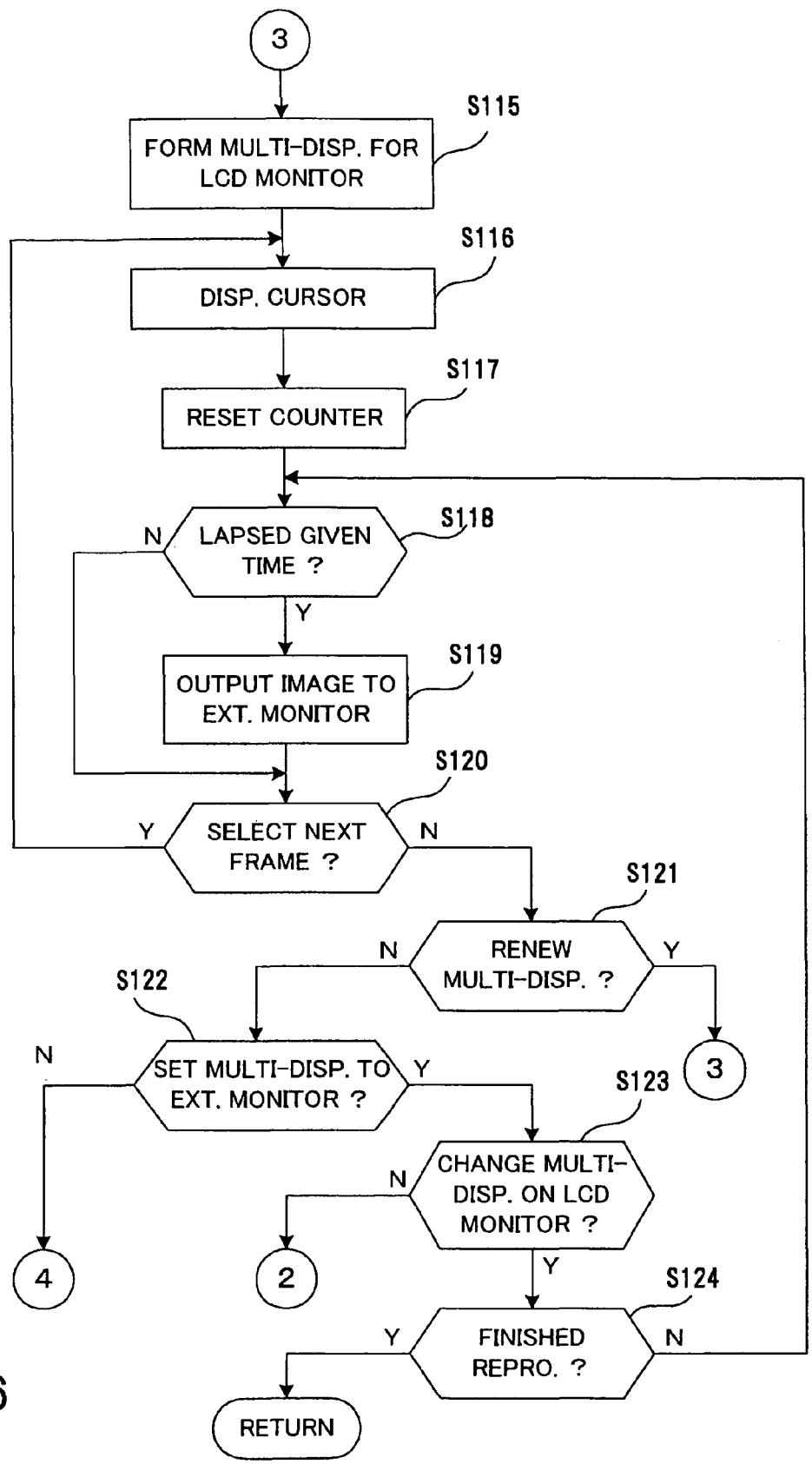
FIG. 6 is a flow chart explaining a display movement of a digital camera and an external monitor according to the present invention.

In step S109, when it is set such that a single frame selected from the multi-display is to output to the external monitor 2, the flow proceeds to step S115 in FIG. 6 to form multi-display for displaying on the LCD monitor 107. In step S116, a cursor for selecting a given image frame is superposed on the formed multi-display and is shown on the LCD monitor 107. An example is shown in FIG. 2. Normally, in the initial image displayed as a multi-display, upper left frame (frame number 1 in this figure) is surrounded with a bold frame indicating as selected. However, FIG. 2 shows the case that frame number 4 is selected by the multi-selector 1093. In step S117, the counter 1041 is reset as the same as step S102. In step S118, whether the selected frame surrounded with a bold cursor is selected for a given time or not is checked. When the given time has not been lapsed as the same reason as step S104, the flow proceeds to step S120. When the given time has been lapsed, the flow proceeds to step S119. In step S119, the image data selected by the cursor is output to the external monitor 2. In step S120, whether a next image frame is selected by the multi-selector 1093 or not is checked. When a next image frame is selected, the flow returns to step S116 to show multi-display with different cursor position. When a next image frame is not selected, the flow proceeds to step S121. In step S121, whether the instruction for renewing the multi-display is made or not is checked.

When the instruction for renewing is made, the flow returns to S115 to form a new multi-display for the LCD monitor 107. When the instruction for renewing is not made, the flow proceeds to step S122. In step S122, similar to the aforementioned step S109, whether it is set that the same multi-display shown on the LCD monitor 107 is output to the external monitor 2 is checked. When the setting is changed to output the multi-display, the flow returns to step S110 to proceed to the sequence for outputting the multi-display to the external monitor 2. When the setting is not changed, the flow proceeds to step S123. In step S123, whether the setting for the multi-display of the LCD monitor 107 is changed or not is checked. When the setting is changed, the flow returns to step S102 for outputting a single image frame. When the setting is not changed, the flow proceeds to step S124. In step S124, whether the reproduction mode has been completed or not is checked. When it is confirmed that the reproduction mode has been completed, the flow proceeds to the end. When it is confirmed that the reproduction mode has not been completed, the flow returns to step S118 to repeat the flow for outputting selected image frame to the external monitor 2.

The above-mentioned sequence makes it possible to carry out multi-display on the LCD monitor 107 as well as to carry out a single frame display on the external monitor 2 by selecting a single frame among the reduced images of the multi-display shown on the LCD monitor 107. Accordingly, even if you are showing a single image frame on a large screen of the external monitor 2, you can confirm what images are stored in addition to this by the LCD monitor of the digital camera. In this case also, when you move the cursor for selecting another image frame within a short time period, a selected image frame before moving the cursor is not output to the external monitor 2. In a digital camera capable of shooting movie, when a movie and a typical image frame representing its contents or literal data indicating the stored contents are stored together in a memory card 106, the typical image frame or literal data may be displayed in a list on the LCD monitor 107 while displaying a selected movie on the external monitor 2.

Figure 7:
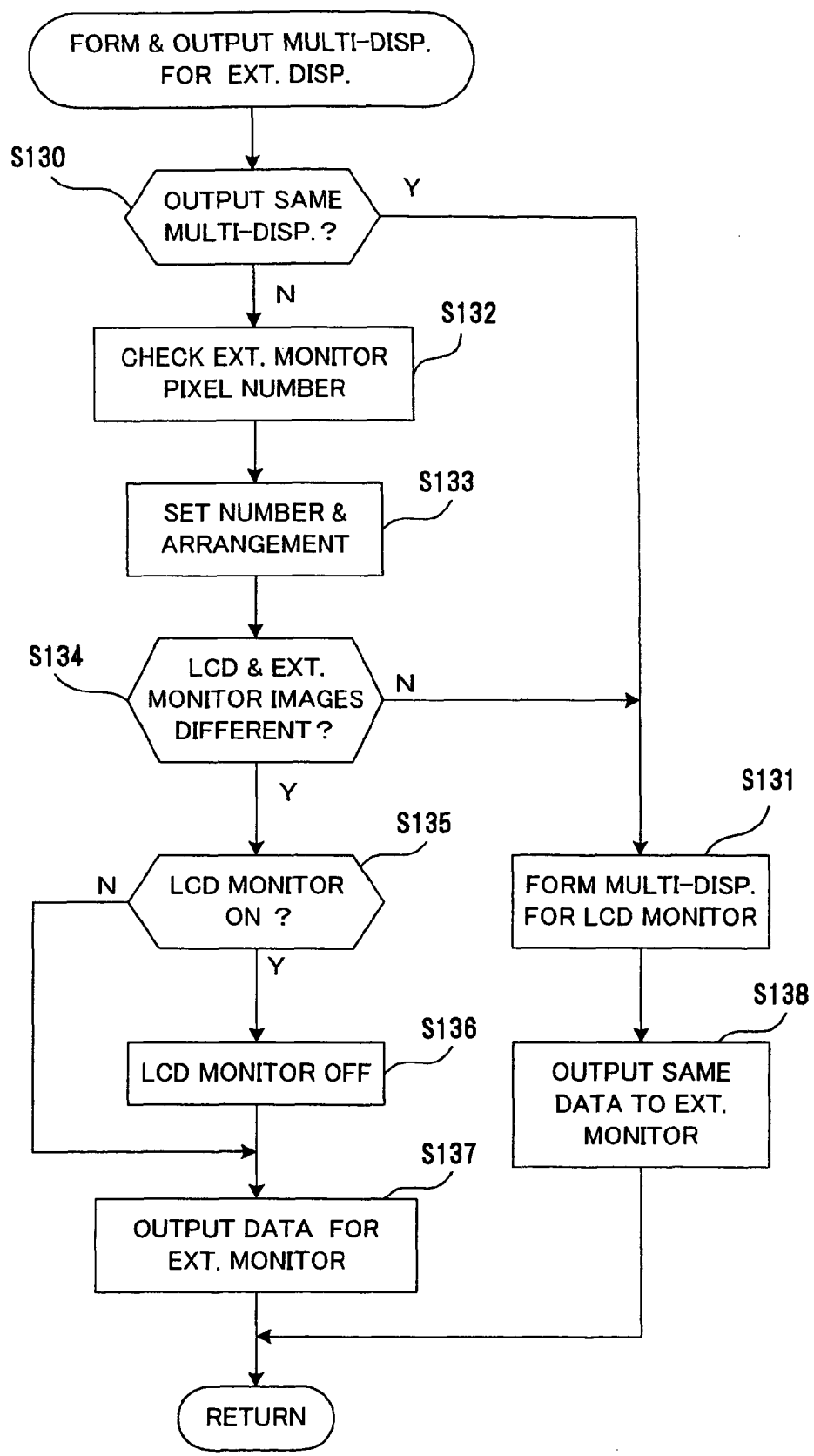
FIG. 7 is a flow chart explaining a display movement of a digital camera and an external monitor according to the present invention.

Then, forming and outputting a multi-display on the LCD monitor 107 and the external monitor 2 in step S110 in FIG. 5 is explained with reference to FIG. 7. In step S130, whether it is set that the same multi-display image data showing on the LCD monitor 107 is shown on the external monitor 2 is checked. Although this setting can be set in advance by using the menu display button 1094 and the multi-selector 1093, either case may be set by default in advance. When it has been set that the same multi-display as the LCD monitor 107 is output to the external monitor 2, the flow proceeds to step S131, otherwise to step S132. In step S132, the numbers of pixels of horizontal and vertical direction of the connected external monitor 2 are identified from the external monitor information read out in step S14 in FIG. 3. In step S133, an arrangement of reduced image frames and the number of frames in the multi-display shown on the large screen 201 of the external monitor 2 are determined in accordance with the identified numbers of pixels.

In step S134, whether the arrangement and the numbers of pixels determined in step S133 are different from those shown on the LCD monitor 107 or not is checked. When they are the same, the flow proceeds to step S131, otherwise to step S135. In step S135, whether the power of the LCD monitor 107 is on or not is checked. When the power is on, since the display content of the LCD monitor 107 is different from that of the external monitor 3, the user may confuse upon selecting an image frame by the multi-selector 1093. In order to prevent this, in step S136, the display of the LCD monitor 107 is off, and in step S137, the multi-display image data for the external monitor 2 is output. In step S134, when the multi-display image of the LCD monitor 107 is the same as that of the external monitor 2, the flow proceeds to step S131. In step S131, the multi-display image for the LCD monitor 107 is formed, and, in step S138, the same multi-display image data as the LCD monitor 107 is output to the external monitor 2.

Figure 9:
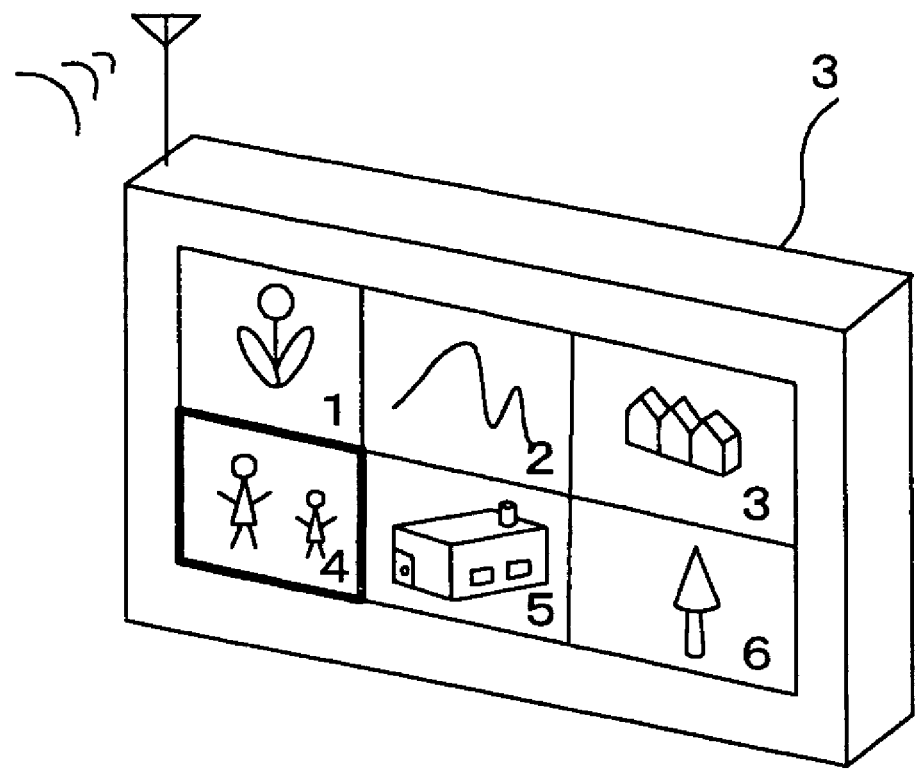
FIG. 9 is a drawing showing another display example of a digital camera and an external monitor according to the present invention.
Figure 9:
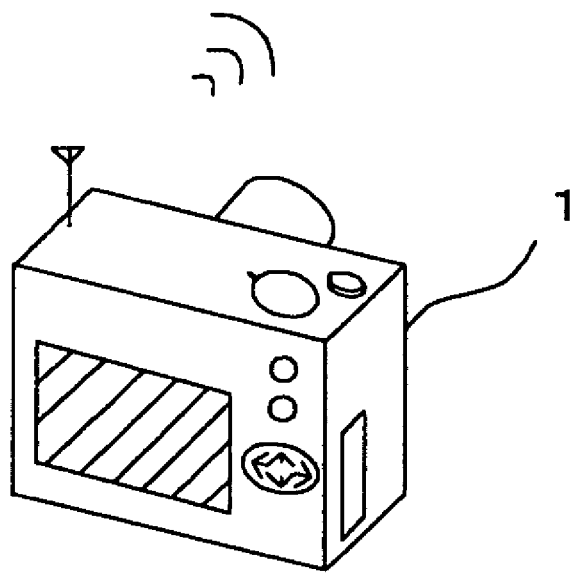

An example of multi-display described above is shown in FIG. 9. In FIG. 9, the digital camera 1 is the same digital camera explained in FIG. 2. An external monitor 3 is different from the external monitor 2 in FIG. 2 and is the one that has a large screen with long sideways. The digital camera 1 displays 2 by 3, 6-image frames on the external monitor 3 on the basis of the vertical and horizontal pixel numbers relative to 2 by 2, 4-image frames on the LCD monitor 107 in FIG. 2. Moreover, 4-image frames of a reduced multi-display shown in FIG. 2 is naturally displayed on the LCD monitor 107 of the digital camera 1. However, while the external monitor 3 is connected, the digital camera outputs image data for 6 image frames to the external monitor 3 and its LCD monitor 107 is off as shown in FIG. 9. In this manner, when the number of image frames displayed on the external monitor is different from that displayed on the LCD monitor, although it is natural that the display arrangement is different in each cases, there is a case that even if the number of image frames to be displayed is not different, the arrangement becomes different. For example, it is the case that an image screen of a cellular phone having one of shorter sides at the top is displayed on a image screen having long sideways of an ordinary TV monitor. In this case also, the LCD monitor of the cellular phone had better be off.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A digital camera for use with an electronic instrument, comprising:
a memory that stores a plurality of image frames;
a display that shows an image frame of the plurality of image frames;
an output means that outputs image data to the electronic instrument;
a multi-display forming means that shows simultaneously the plurality of image frames stored in the memory;
an image selector that allows a user to select a specific image frame among the plurality of image frames of the multi-display shown on the display;
a controller that controls the output means to output only the specific image frame selected by the image selector as the image data when the multi-display is shown on the display;
a measuring means that measures a lapsed time for which the specific image frame has been selected; and
a detector that detects whether the lapsed time measured by the measuring means passes a fixed predetermined time;
wherein the controller controls the output means to output as the image data the specific image frame selected by the image selector to the electronic instrument on the condition that the detector detects that the lapsed time has passed the fixed predetermined time.

2. The digital camera according to claim 1, wherein the output means outputs the image data to the electronic instrument through a network.

3. The digital camera according to claim 1, wherein the image data is the whole image data of the image frames stored in the memory.

4. The digital camera according to claim 1, wherein the image data is the image data stored in the memory after being thinned out with a given ratio.

5. A digital camera comprising:
a first display that displays an image data;
a display means having a second display, different from the first display, that displays the image data;
an interface that communicates data with the display means;
a discrimination means that discriminates horizontal and vertical pixel information of the second display connected through the interface; and
a setting means that sets a number of reduced image frames such that in a multi-display showing a plurality of image frames on a same image screen at a time, the number of the plurality of image frames is set to a predetermined number for the image data displayed by the first display and is set to the number of reduced image frames based on the discrimination result of the discrimination means for the image data displayed by the second display;
an output means that outputs output data of the multi-display shown on the second display from the interface, wherein
if the number of the image data of the multi-display shown on the second display is different from the predetermined number of the image data, the first display is controlled to be off when the output means outputs the output data from the interface.

6. The digital camera according to claim 5, further comprising an instruction means that instructs the first display to show the multi-display having the same number of image data as the multi-display shown on the second display set by the setting means.

7. The digital camera according to claim 5, further comprising:
an off instruction means that instructs the first display to be off when the output means outputs output data.

8. The digital camera according to claim 5, wherein the interface communicates data with the display means through a network.

9. An image reproduction apparatus for use with an electronic instrument, comprising:
a memory that stores a plurality of image frames;
a display that shows an image frame of the plurality of image frames;
an output means that outputs image data to the electronic instrument;
a multi-display forming means that shows simultaneously the plurality of image frames stored in the memory;
an image selector that allows a user to select a specific image frame among the plurality of image frames of the multi-display shown on the display;
a controller that controls the output means to output only the specific image frame selected by the image selector as the image data when the multi-display is shown on the display;
a measuring means that measures a lapsed time for which the specific image frame has been selected; and
a detector that detects whether the lapsed time measured by the measuring means passes a fixed predetermined time;
wherein the controller controls the output means to output as the image data the specific image frame selected by the image selector on the condition that the detector detects that the lapsed time has passed the fixed predetermined time.

10. An image reproduction apparatus comprising:
a first display that displays an image data;
a display means having a second display, different from the first display, that displays the image data;
an interface that communicates data with the display means;
a discrimination means that discriminates horizontal and vertical pixel information of the second display connected through the interface; and
a setting means that sets a number of reduced image frames such that in a multi-display showing a plurality of image frames on a same image screen at a time, the number of the plurality of image frames is set to a predetermined number for the image data displayed by the first display and is set to the number of reduced image frames based on the discrimination result of the discrimination means for the image data displayed by the second display;
an output means that outputs output data of the multi-display shown on the second display from the interface, wherein
if the number of the image data of the multi-display shown on the second display is different from the predetermined number of the image data, the first display is controlled to be off when the output means outputs the output data from the interface.

* * * * *